US009517485B1

(12) United States Patent
Crosby, Jr.

(10) Patent No.: US 9,517,485 B1
(45) Date of Patent: Dec. 13, 2016

(54) LAWN-MOWER-MOUNTED SPRAYERS, ASSEMBLIES, COMPONENTS, AND METHODS

(71) Applicant: Gerald D. Crosby, Jr., Schererville, IN (US)

(72) Inventor: Gerald D. Crosby, Jr., Schererville, IN (US)

( * ) Notice: Subject to any disclaimer, the term of this patent is extended or adjusted under 35 U.S.C. 154(b) by 0 days.

(21) Appl. No.: 14/703,853

(22) Filed: May 4, 2015

Related U.S. Application Data

(60) Provisional application No. 61/987,637, filed on May 2, 2014.

(51) Int. Cl.
| | |
|---|---|
| *B05B 15/06* | (2006.01) |
| *B05B 9/00* | (2006.01) |
| *A01C 23/00* | (2006.01) |
| *A01M 7/00* | (2006.01) |
| *A01D 34/00* | (2006.01) |

(52) U.S. Cl.
CPC .......... *B05B 15/061* (2013.01); *A01C 23/008* (2013.01); *A01D 34/001* (2013.01); *A01M 7/0035* (2013.01); *A01M 7/0046* (2013.01); *A01M 7/0082* (2013.01); *A01M 7/0085* (2013.01); *B05B 9/007* (2013.01)

(58) Field of Classification Search
CPC ...... B05B 7/0093; B05B 7/2475; B05B 9/007; B05B 9/01; B05B 15/00; B05B 15/06; B05B 15/061; A01C 23/008; A01C 23/047
See application file for complete search history.

(56) References Cited

U.S. PATENT DOCUMENTS

| | | | | | |
|---|---|---|---|---|---|
| 2,721,437 | A | * | 10/1955 | Greenlund | A01D 43/14 222/621 |
| 2,759,292 | A | * | 8/1956 | Whipple | A01M 15/00 43/129 |
| 3,338,524 | A | * | 8/1967 | Rhein | A01D 43/14 239/129 |
| 3,595,481 | A | * | 7/1971 | Enblom | A01M 13/00 239/129 |
| 3,722,820 | A | * | 3/1973 | Klint, Jr. | A01D 43/14 239/129 |
| 5,109,629 | A | * | 5/1992 | King, Jr. | A01M 17/002 239/289 |
| 6,145,288 | A | * | 11/2000 | Tamian | A01C 23/00 56/16.4 A |

(Continued)

*Primary Examiner* — Ryan Reis
(74) *Attorney, Agent, or Firm* — Fantastic IP Consulting; Eduardo E. Drake

(57) ABSTRACT

To make it easier for millions of Americans to weed their lawns, the present inventor devised, among other things, a way to carrying a lawn care sprayer on a push mower and thus relieve the burden of carrying the sprayer and eliminates the expense of purchasing a riding mower and tow-behind sprayer. One exemplary embodiment includes a holster structure and a spray tank, with the holster structure attaching to the push rails of a push mower and the spray tank mounting removably to the holster structure. This arrangement provides easy and convenient access to the sprayer function as a user mows his or her lawn, eliminating the need to make kill weeds and mow as separate tasks. Moreover, some embodiments provide a dual chamber tank, which provides further efficiency by allowing users to choose between weed killers, or other lawn or garden treatments while mowing.

11 Claims, 5 Drawing Sheets

(56) References Cited

U.S. PATENT DOCUMENTS

| | | | |
|---|---|---|---|
| 6,908,052 B1 * | 6/2005 | Jacobson | A01D 43/14 239/146 |
| 2012/0118328 A1 * | 5/2012 | West | B05B 7/2472 134/22.12 |

* cited by examiner

LAWN-MOWER-MOUNTED SPRAYERS, ASSEMBLIES, COMPONENTS, AND METHODS

COPYRIGHT NOTICE AND PERMISSION

A portion of this patent document contains material subject to copyright protection. The copyright owner has no objection to the facsimile reproduction by anyone of the patent document or the patent disclosure, as it appears in the patent and trademark office patent files or records, but otherwise reserves all copyrights whatsoever. The following notice applies to this document: Copyright© 2015, GERALD D. CROSBY, JR.

RELATED APPLICATION

The present application claims priority to U.S. Provisional Patent Application 61/987,637, which was filed May 2, 2014 and which is incorporated herein by reference.

TECHNICAL FIELD

Various embodiments of the invention relate generally to lawn care equipment and methods, particularly application of weed killers and other liquid treatments.

BACKGROUND

Millions of Americans take pride in owning and maintaining their own homes. One essential home maintenance activity is lawn care, which generally includes the labor-intensive task of weeding.

The present inventor recognized that conventional methods of eliminating lawn weeds are problematic. For example, many homeowners, who abhor the task of manually pulling weeds, spray individual weeds with a chemical weed killer, carrying a spray tank filled with weed killer on their backs and as they walk their lawns looking for weeds. Although this is considerably less work than kneeling and pulling the weeds up by hand, it does require them to carry around the weight of the sprayer tank as they traverse their lawns in search of weeds. Moreover, the problem is compounded for those who use multiple types of weed killers, for example one that is effective against all plants and another that is specific to a small subset of weeds. One partial solution is to use riding lawn mowers to pull sprayers behind, but these are not only expensive and impractical for smaller lawns, but typically allow use of only one type of weed killer at a time.

Accordingly, the present inventor has recognized a need for a better way of helping homeowners eliminate weeds from their lawns.

SUMMARY

To address one or more of these and/or other needs or problems, the present inventor devised, among other things, one or more exemplary systems, kits, methods, devices, assemblies, and/or components related to lawn sprayers.

In one exemplary embodiment, the invention takes the form of a holster structure and a spray tank assembly. The holster structure fits between and attaches to the left and right push rails of a push mower. And the spray tank mounts to the holster structure, enabling the mower to carry the weight of the tank and providing easy and convenient access to the sprayer function as a user mows his or her lawn.

In some embodiments, two spray tanks are mounted to the holster assembly, each containing a different type of lawn chemical. For example, one tank may contain an all purpose weed killer and the other a special purpose weed killer that is safe for grass, thus providing users choice of weed killer as they mow their lawn. Alternatively, one may contain a weed killer, and the other a pesticide, and still others may place a liquid plant food or fertilizer. The two spray tanks can be molded from plastic and share a common wall. Some embodiments may include more than two tanks, and some embodiments include back straps on the tanks enabling users to detach them from the holster assembly and carry as backpacks.

Still other embodiments include storage compartments on the holster structure, enabling users to store various lawn care and mower tools close at hand. Yet other embodiments include a separate compartment for stowing trash and other debris picked up while mowing. Other embodiments configure the holster assembly for attachment to a mulcher, seeder, or other landscaping machine.

BRIEF DESCRIPTION OF THE DRAWINGS

Various embodiments are described herein with reference to the following attached figures (FIGS.). These figures are annotated with reference numbers for various features and components, and these numbers are used in the following description as a teaching aid, with like numbers referring to the same or similar features and components.

DETAILED DESCRIPTION OF THE EXEMPLARY EMBODIMENT(S)

This document, which incorporates drawings and claims, describes one or more specific embodiments of one or more inventions. These embodiments, offered not to limit but only to exemplify and teach the invention, are shown and described in sufficient detail to enable those skilled in the art to implement or practice the invention(s). Thus, where appropriate to avoid obscuring the invention(s), the description may omit certain information known to those of skill in the art.

Figure 1:
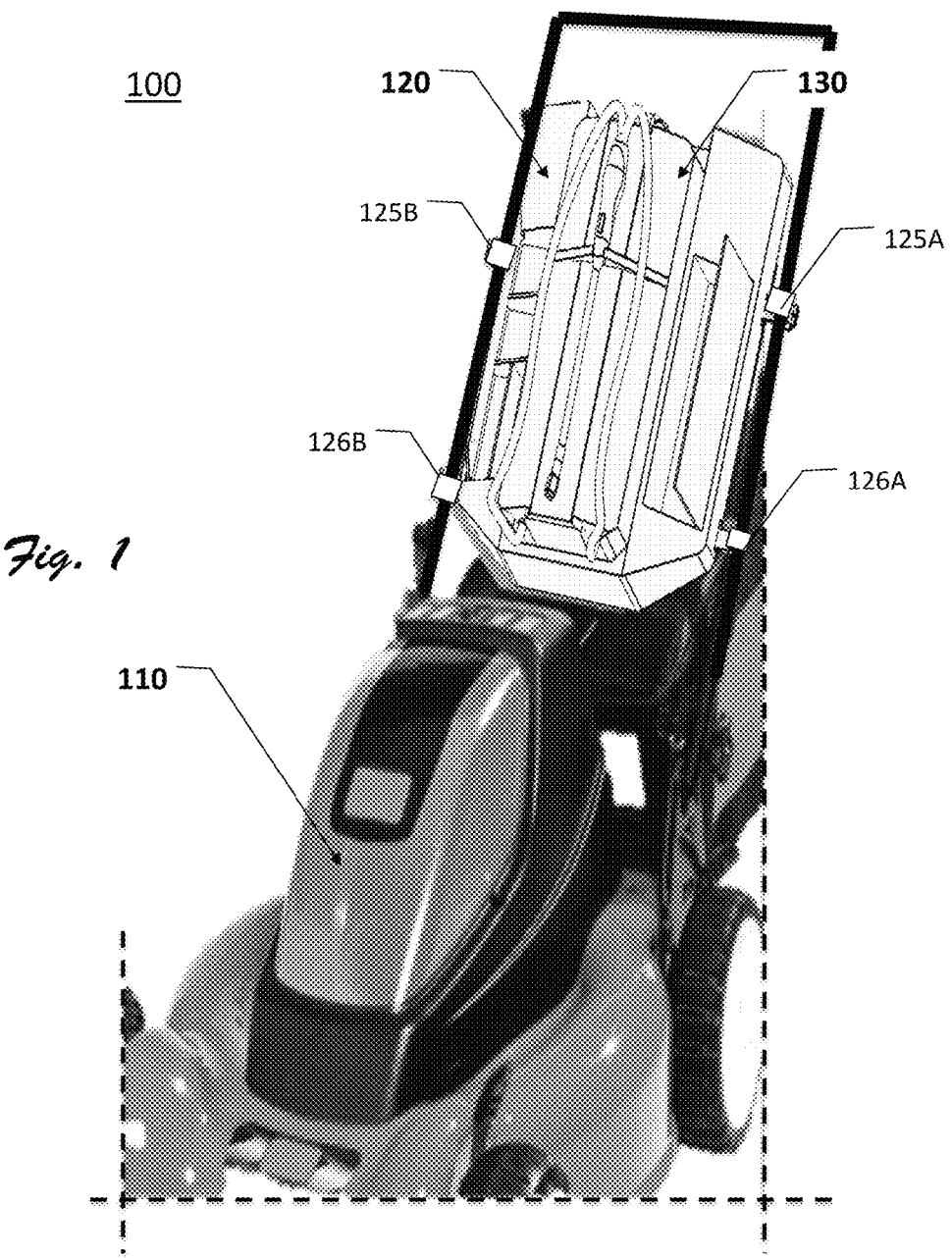
FIG. 1 is a front perspective view of a lawnmower sprayer system 100 corresponding to one or more embodiments of the present invention.

FIG. 1 shows an exemplary lawn mower sprayer system 100. System 100 includes a push mower 110, a holster assembly 120, and a sprayer assembly 130. Push mower 110, which in the exemplary embodiment takes the form of an electric or gasoline-engine powered self-propelled or non-self-propelled mower, includes generally parallel handle bars or push rails 111 and 112. Coupled to and between push rails 112 and 114 is holster assembly 120.

Figure 2:
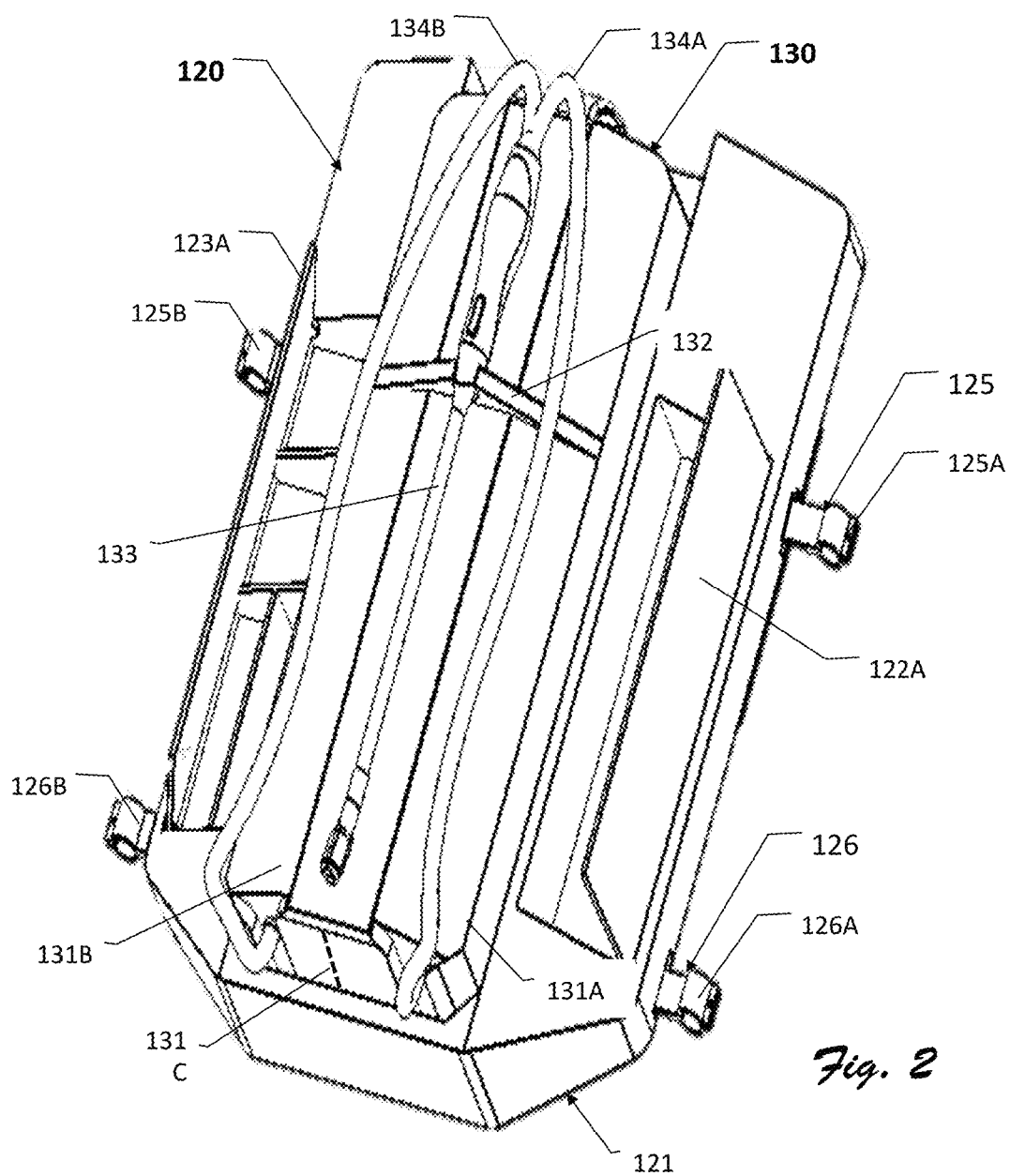
FIG. 2 is an enlarged perspective view of the sprayer-holster portion of system 100, corresponding to one or more embodiments of the present invention.
Figure 3:
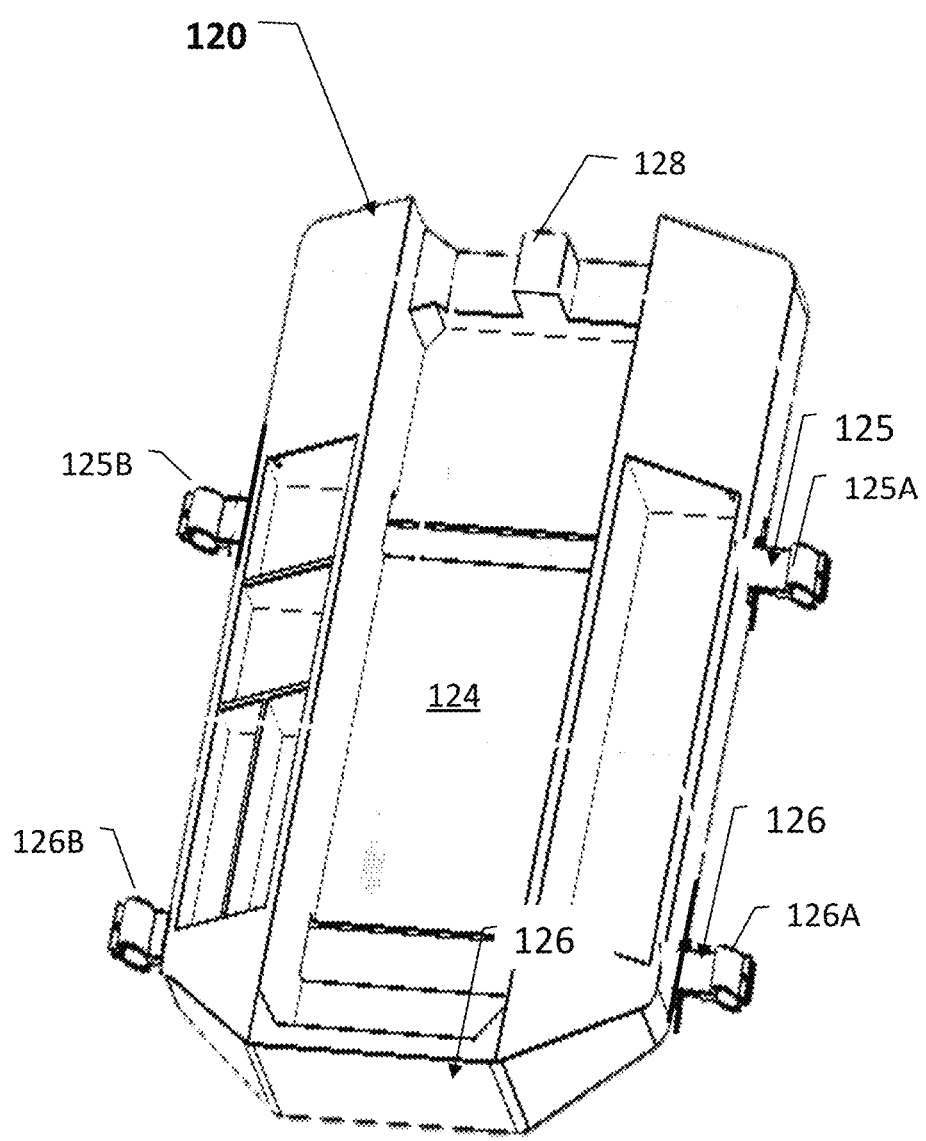
FIG. 3 is a front perspective view of the holster portion of system 100, corresponding to one or more embodiments of the present invention.
Figure 4:
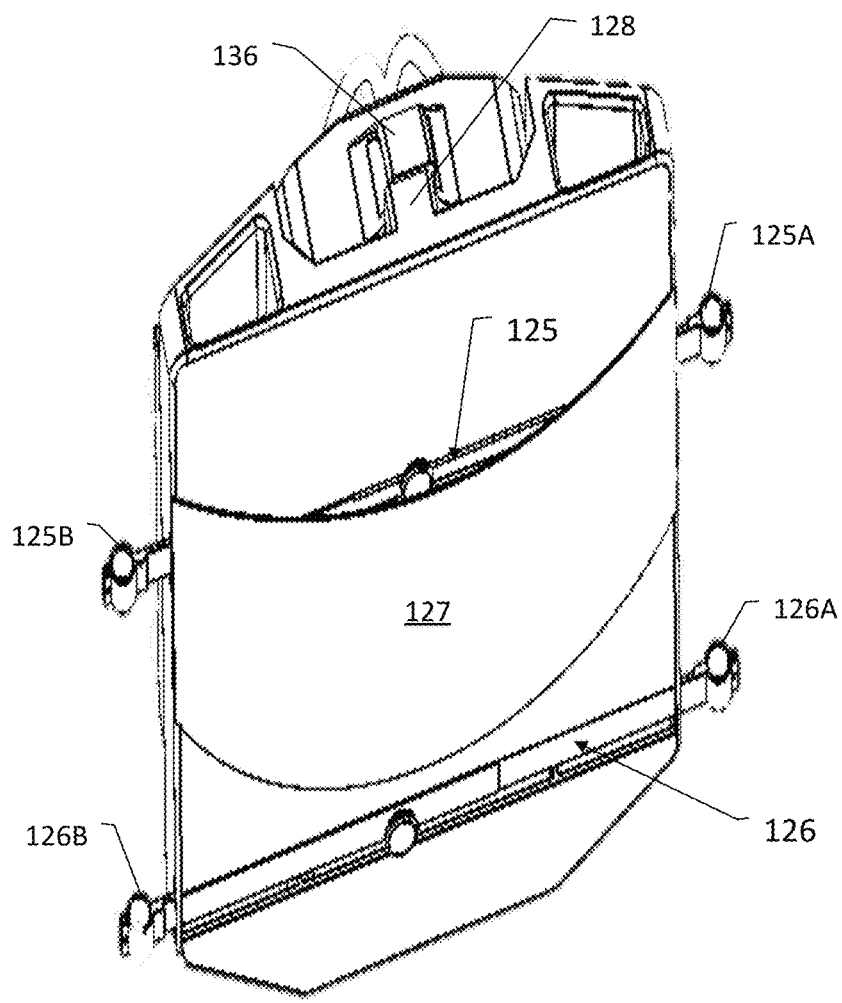
FIG. 4 is a back perspective view of the sprayer-holster portion of system 100, corresponding to one or more embodiments of the present invention.

Holster assembly 120, shown also in FIGS. 2, 3, and 4, includes a molded or ultrasonically welded plastic base structure 121 having respective left and right tool storage bays or regions 122 and 123, a sprayer bay 124, and upper and lower adjustable cross braces 125 and 126, a back storage pocket 127, and a tank retaining member or cleat 128. Tool storage bays 122 and 123 include respective hinged lids 122A and 123B and are sized to store a variety of lawn care and/or lawn mower related parts with one or more dividers (not labeled). (Some embodiments may form holster assembly 120 of a canvas, Cordura, ballistic nylon, and/or a mixture of these soft materials and plastic.)

Upper and lower cross braces 125 and 126, which are formed of steel for example, extend through holster sidewalls 127A and 127B and are terminated with push rail clamps 125A, 125B and 126A, 126B, which clamp or clip on or otherwise fasten to push rails 111 and 112. The cross braces are adjustable via a two-part telescoping arrangement with a thumbscrew lock, allowing the holster assembly to fasten to a wide range of push mowers or other landscaping machine. Back storage pocket 127, a three-seamed flexible pocket in the exemplary embodiment, has an open top well suited to receive trash and other debris picked up while mowing. Some embodiments may provide bottle or cups holders (not shown) or other accessories that clip on or fit within pocket 127. Fitted within sprayer bay 124 between storage bays 122 and 123 is sprayer assembly 130.

Figure 5:
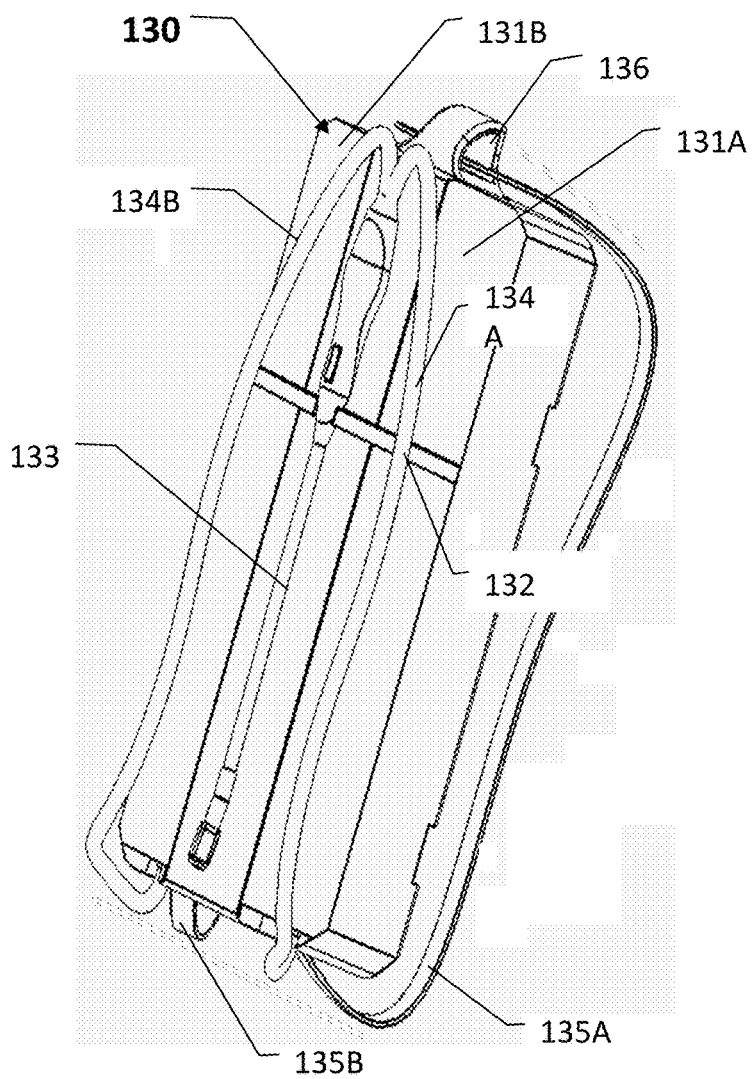
FIG. 5 is a front perspective view of the sprayer assembly portion of system 100, corresponding to one or more embodiments of the present invention.

Sprayer assembly 130, shown best in FIGS. 2 and 5, includes a dual sprayer tank 131, a spray wand retainer clip 132, a sprayer wand 133, spray hoses 134A and 134B, back straps 135A and 135B, and tank retaining member or recess 136.

Dual spray tank 131, formed of injection- or blow-molded or ultrasonically welded plastic, includes tanks two tanks 131A and 131B separated via a common interior sidewall 131C. One of the tanks may contain a general herbicide that kills virtually any plant, including common lawn grasses, and the other may contain a milder herbicide that is safe for common grasses but destroys other forms of plants. Tanks 131A and 13B include respective filling nozzles and caps (not shown.) Mounted or formed on the exterior front wall of the tank is spray wand retainer clip 132, which snap fits or clips onto sprayer wand 133, holding it in place when not is use. Spray hoses 134A and 134B establish fluid communication between sprayer wand 133 and respective tanks 131A and 131B. In some embodiments, sprayer wand 133 may have two solution delivery channels (not shown) to prevent mixing of the fluids from tanks 131A and 131B. Back straps 135A and 135B enable carrying of the sprayer assembly on the back of a user after removal from holster assembly 120. Tank retaining member 136 engages with retaining cleat 128, ensure a strong interference fit or lock of the tank sprayer assembly within bay 124. Some embodiments include a top and/or side handle that provide additional ways for carrying the sprayer assembly went decoupled from the holster assembly. For example, the top handle may attach to points on other side of retaining member 136.

Sprayer assembly 130 may operate according to a variety of known principles. For example, in some embodiments, each tank may be pressurized via a manual plunger or other form of pressure generator. In still others, it may include an electric or manual pump in the handle or included in line or within each of the tanks.

CONCLUSION

In the foregoing specification, specific exemplary embodiments have been described. However, one of ordinary skill in the art appreciates that various modifications and changes can be made without departing from the scope of the invention as set forth in the claims below. For example, different materials and geometries may be used for the holster assembly and sprayer assemblies. The assemblies may be oriented differently relative to each other, and various components of the assemblies may be also be oriented differently relative each other. Some components and/or assemblies may be inverted and/or omitted entirely. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms, such as second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the term "exemplary" is used as an adjective herein to modify one or more nouns, such as embodiment, system, method, device, and is meant to indicate specifically that the noun is provided as a non-limiting example.

What is claimed is:

1. An assembly comprising:
    a first spray tank in fluid communication with a spray nozzle, with the spray tank having a sidewall;
    a holster structure removably attached to the sidewall of the spray tank and configured to removably attach to first and second push rails of a lawnmower, wherein the holster structure includes at least one storage compartment for lawn tools or other items, and wherein the first spray tank is configured for removal and use separate from the holster structure while the holster structure is attached to the rails of the lawn mower.

2. The assembly of claim 1, wherein the holster structure includes first and second opposing sides, with the first side having at least one clamp configured to clamp onto the first push rail and the second side having at least one clamp configured to clamp onto the second push rail.

3. The assembly of claim 1, wherein the holster structure includes a top and a bottom, with the top contacting the sidewall of the first spray tank and wherein the at least one storage compartment is closable.

4. The assembly of claim 3, wherein the bottom of the holster structure includes another storage compartment.

5. The assembly of claim 1, further comprising at least one back strap connected to the first spray tank.

6. The assembly of claim 1, further comprising a second spray tank attached to the holster structure, with second spray tank sharing a common sidewall with the first spray tank and being in fluid communication with the spray nozzle.

7. An assembly comprising:
- a push lawn mower having first and second push rails;
- a holster structure attached to the first and second push rails and having a top and a bottom, with top having first and second storage regions and a central region therebetween;
- a dual spray tank assembly removably attached to the central region of the holster structure and having at least one back strap for carrying the dual spray tank assembly, the dual spray tank assembly having first and second spray tanks sharing a common sidewall and in fluid communication with a common spray nozzle.

8. The assembly of claim 7, wherein the base structure includes a plastic plate structure and a pair of metal brace members which extend through the plate structure between the first and second push rails.

9. The assembly of claim 7, wherein the first and second storage regions are integrally molded into the plastic plate structure.

10. A method comprising:
- attaching a holster structure between first and second push rails of a lawn mower;
- installing a spray tank in or on the holster structure, with the spray tank having a spray nozzle in fluid communication therewith;
- operating the lawn mower to mow at least a portion of a lawn; and
- operating the spray nozzle to spray a portion of the lawn while the lawn mower is operating;
- wherein operating the spray nozzle includes operating the spray nozzle to spray a first lawn-safe herbicide from the first spray tank to a first portion of the lawn, and operating the spray nozzle to spray a non-lawn-safe herbicide from the second tank to a second portion of the lawn.

11. The method of claim 10, wherein installing the spray tank in or on the holster structure includes installing a dual spray tank in or on the holster structure, wherein the dual spray tank includes first and second spray tanks sharing a common sidewall.

* * * * *